Dec. 9, 1952  H. A. DARRIN  2,621,066
AUTOMOBILE BUMPER AND CHASSIS CONSTRUCTION
Filed Feb. 21, 1948
FIG. 1.
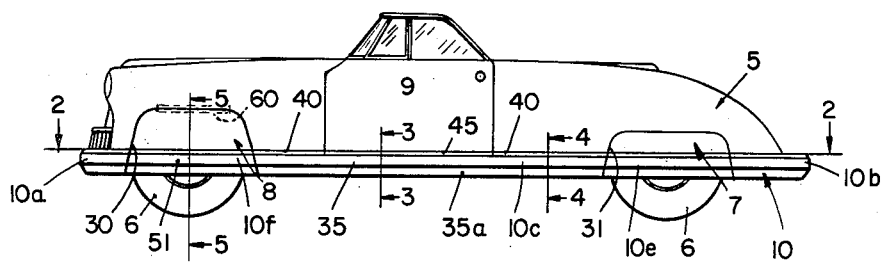
FIG. 2.
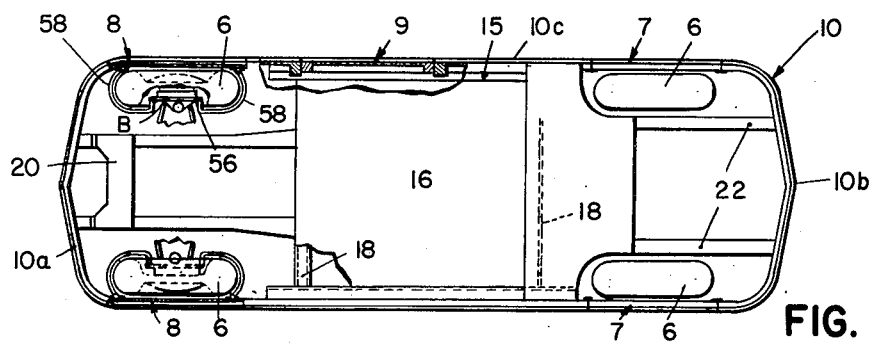
FIG. 3.    FIG. 4.    FIG. 5.
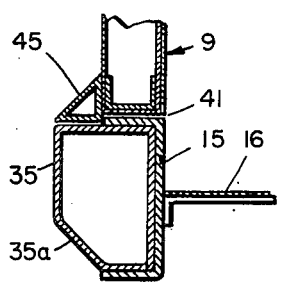 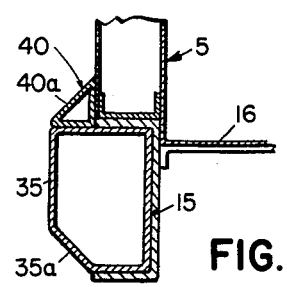 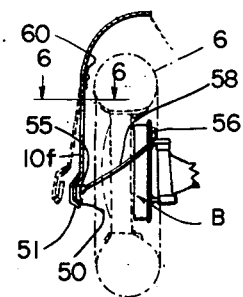
FIG. 7.    FIG. 6.
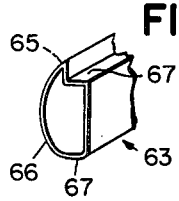 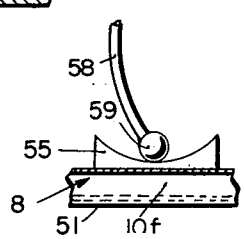
INVENTOR
HOWARD A. DARRIN
BY *Norman Graham*
ATTORNEYS Patented Dec. 9, 1952

2,621,066

UNITED STATES PATENT OFFICE 2,621,066

AUTOMOBILE BUMPER AND CHASSIS CONSTRUCTION

Howard A. Darrin, Los Angeles, Calif.

Application February 21, 1948, Serial No. 10,093

1 Claim. (Cl. 293—63)

My present invention has to do with automobile bumper and chassis construction, it being an object to provide a bumper which extends substantially entirely around the vehicle.

Another object is to provide a combination bumper and chassis construction wherein the bumper is incorporated as an integral part of the sides of the chassis frame.

A further object is to provide a bumper construction which enables the vehicle body door to be made thinner.

Other objects and advantages will become apparent from the following description of presently preferred embodiments of the invention, for which purpose I shall make reference to the annexed drawings wherein:

Fig. 1 is a side elevation;

Fig. 2 is a plan section taken on line 2—2 of Fig. 1;

Figs. 3, 4 and 5 are enlarged sections taken on lines 3—3, 4—4, 5—5, respectively, of Fig. 1;

Fig. 6 is an enlarged fragmentary detail taken on line 6—6 of Fig. 5; and

Fig. 7 is a fragmentary perspective showing a modification.

I wish it understood, however, that the specific details of construction now to be described and the arrangement illustrated in the drawings are intended only to be illustrative and explanatory and are not to be considered as limitative upon the broader aspects of the invention as defined by the appended claim.

In my copending application Serial No. 769,125, filed August 18, 1947, now Patent No. 2,551,528, issued May 1, 1951, I have shown and described a vehicle chassis frame construction which not only possesses great strength and collision resistance, but which is also conducive to obtaining a stream-lined and low slung body construction as well as maximum seating capacity for an automobile. I have found that the chassis construction therein described is peculiarly adapted for use as an element of my new combination bumper and frame construction since, there, the side frame elements are flush with the sides of the body.

Referring now to the drawings, I show an automobile having a body 5, wheels 6, fender flaps 7, 8, and a bumper 10.

The body is supported upon a somewhat rectangular chassis frame upon which the floor 16 is mounted independently of the body. The frame has cross members 18 extending from side to side, and has forwardly projecting front frame extensions whose outer ends are connected by a cross piece 20. Extending rearwardly from the frame 15 I provide a pair of parallel rear extensions 22.

The bumper 10 consists of a front end section 10a, a rear end section 10b, side sections 10c and fender flap sections 10e and 10f. The end section 10a is fixed to the frame extensions and the rear end section 10b is fixed to the rear frame extensions 22, the front end section extending around and along the sides sufficiently to intersect the fender recesses 30 for which the flaps 8 are provided. The rear bumper section extends around the back and thence along the side far enough to intersect the rear fender recesses 31.

The respective side sections 10c are formed and mounted in the following manner: As best shown in Figs. 3 and 4, the side frame elements 15 are channel shaped in cross section, with the channel opening outwardly. Within the channel of each of these side frame elements I fix, as by welding, an outer side frame and bumper element 35 which is generally box-shaped in cross section except that its lower outer corner portion is diagonally inwardly disposed so as to present a deflecting surface 35a.

Fixed to the top of the bumper element 35 from each of the respective recesses 30, 31 to the respective side edges of the door 9 of the body, I provide upper bumper strips or molding elements 40. Each of these strips is fixed, as by welding, to the top of the main bumper portion 35 and also may be secured to the outer surface of the body. These strips 40 are triangular in section, the outer surface 40a presenting a deflecting surface.

As will be noted in Figs. 1 and 3 the bottom edge of the door 9 terminates at the frame with only sufficient clearance 41 to permit the hinged door to swing open without rubbing against the frame.

Fixed to the outer surface of each door 9, adjacent its bottom edge, I provide a bumper strip or molding 45 which is unattached to the bumper 35 but has its flat bottom surface substantially in contact with the top surface of bumper 35 so that as the door is swung open and closed the strip 45 moves with the door, and when the door is closed the strip functions as a component part of the bumper, being in line with the contiguous strips 40.

To reduce the weight of the fender flaps 7, 8, I prefer to form the fender flap sections of the bumper as follows: I outwardly emboss each flap to conform to the outer surface of the contiguous parts of the bumper and strip or molding elements before described. This embossing is shown at 50 (Fig. 5). I fix, as by welding, to the outer surface of each embossed area a bumper strip 51 which has an outer surface conforming to the shape of the contiguous bumper and bumper strip elements and being aligned therewith. The strips 51 are, of course, not called upon in use to perform any substantial bumper function but are chiefly for the purpose of providing auxiliary bumper sections which continue the lines of the bumper so that it extends entirely around the vehicle.

In my copending application Serial No. 11,976, filed February 28, 1948, now abandoned, I describe an arrangement for causing the front fender flaps 8 to swing outwardly in response to the swinging movement of the vehicle, and while this mechanism does not form any particular part of the present invention I shall describe it briefly since it has peculiar value in connection with my improved bumper construction.

As will be noted in Figs. 2, 5 and 6, a pair of inwardly curved plates 55 is secured, as by welding, and in alinement with each other, to the inner surface of the flap, and, secured to the brake drum B of each front wheel, I provide a bracket 56 which carries a pair of arms 58, each having a spherical end 59 slidably engageable with a plate 55. These arms for each wheel curve oppositely and downwardly around the wheel to permit free rotation of the wheel on its spindle, but as the wheel is swung during steering, the arms swing with the wheel, causing the spherical ends of the arms to engage the respective plates 55 to swing the flap outwardly about its hinged connection 60 to the fender. By having the curved or concaved inner surfaces of the plates 55, the fender flap is caused to swing outwardly only enough to permit the wheel to swing in course of steering.

It will be understood, of course, that the particularly illustrated cross-sectional shape of the bumper elements and frame elements are not essential, since any desired cross-sectional shape may be adopted which will permit the bumper to be supported by the frame. For instance, in Fig. 7 I show a variational form of bumper element 63, in which the upper portion 65 (corresponding to molding strip 40) is made integral with the lower main bumper portion 66, and the outer surface of the bumper is curved as shown. The top and bottom surfaces 67 are parallel so as to permit the bumper to fit snugly in the channel frame 15. Of course, the door sections of the bumper, corresponding to section 10c, have the portion corresponding to strip 40 separate from the lower portion of the bumper as before described, so that the upper portion may be attached to the door.

From the foregoing, it will be seen that the bumper has sufficient chassis frame support substantially all around the vehicle to provide effective bumper function as well as to improve the appearance of the vehicle. Also, the door and body for a given width of side frame element may be reduced in thickness to the extent of the width of the strips 40.

I claim:

In a vehicle having a chassis frame, a body supported on the frame and a door swingably carried by the body and having its outer surface flush with the outer surface of the body and its bottom edge terminating adjacent the top of the frame, bumper means comprising a main bumper element attached to the frame and disposed below the plane of the bottom of the door and body and extending along the side of the frame beyond the planes of the side edges of the door, said bumper element having its outer side surface disposed in a plane spaced outwardly from the plane of the outer surface of the body and door, upper bumper strips secured at their bottom surfaces to the top surface of said main bumper element, said bumper strips terminating at the sides of the door, and an auxiliary bumper strip coextensive in length with the width of and fixed to the door adjacent the bottom thereof, said bumper strips and said auxiliary bumper strip being substantially triangular in cross section whereby to have their outer edge portions substantially flush with the outer surface of the main bumper element and their top edge portions substantially flush with the plane of the outer surface of the door and body.

HOWARD A. DARRIN.

REFERENCES CITED

The following references are of record in the file of this patent:

UNITED STATES PATENTS

| Number | Name | Date |
|---|---|---|
| D. 150,161 | Sanmori | July 6, 1948 |
| 1,858,743 | Langstreth | May 17, 1932 |
| 2,031,219 | Koch | Feb. 18, 1936 |
| 2,099,867 | Saives | Nov. 23, 1937 |
| 2,232,275 | Ronning | Feb. 18, 1941 |
| 2,312,052 | Premo | Feb. 23, 1943 |
| 2,329,808 | Wolfe | Sept. 21, 1943 |
| 2,354,700 | Pezzano | Aug. 1, 1944 |
| 2,420,894 | Mee | May 20, 1947 |

FOREIGN PATENTS

| Number | Country | Date |
|---|---|---|
| 343,736 | Great Britain | Feb. 26, 1931 |

OTHER REFERENCES

"Striking New U. S. Design" from "Autocar" of Sept. 13, 1946, pages 798 and 799.